United States Patent [19]

Simeonov et al.

[11] 4,076,546
[45] Feb. 28, 1978

[54] METHOD FOR PRODUCTION OF EXPANSIVE CEMENT

[75] Inventors: Yordan Todorov Simeonov; Nikola Borissov Djabarov, both of Sofia, Bulgaria

[73] Assignee: Centralna Laboratoria Po Physiko-Chimicheska Mechanika pri Ban, Sofia, Bulgaria

[21] Appl. No.: 751,864

[22] Filed: Dec. 17, 1976

[30] Foreign Application Priority Data

Dec. 30, 1975  Bulgaria ................................. 31971

[51] Int. Cl.$^2$ .............................................. C04B 7/35
[52] U.S. Cl. ............................... 106/89; 106/314
[58] Field of Search .................... 106/89, 314, 315

[56] References Cited
U.S. PATENT DOCUMENTS 2,465,278  3/1949  Schenker et al. .................... 106/314

*Primary Examiner*—J. Poer
*Attorney, Agent, or Firm*—E. Janet Berry; Lawrence Rosen

[57] ABSTRACT

A method for the production of an expanding cement which includes the steps in which so-called "Portland cement" is dry-mixed with an expanding additive which comprises 6 to 30% of the total weight of the cement. The expanding additive contains 2 to 8% dialuminium pentahydroxychloride, 4% to 15% gypsum, and optionally, a small amount up to about 7% lime. All percentages are by weight.

The dialuminium pentahydroxychloride ($Al_2(OH)_5Cl$ 2.5 $H_2O$) is a source of aluminium ions, which are necessary to form an increased (expanded) quantity of ettringite. It has high solubility, forming a solution having a concentration above 50%, and has a high content of active dialuminium trioxide (approximately 46%), a low content of chlorine and is not hygroscopic. The lime component is not critical and its addition depends on the desirability for greater expansion (without lime) or lesser expansion and higher strength (with lime). With Portland cement of higher activity (mark 450 or more), the expansion is less but the strength is greater; with Portland cement of lower activity (marks 350 and 250), greater expansion is obtained but there is less strength.

The dry mixing of the compounds is done either by grinding them together at the same time as the Portland cement or by first grinding the cement and the ingredients separately, then mixing them, and finally, homogenization. The expansion of the cement stone is thus controlled with precision and occurs in the first 1 to 2 days after hardening either in water or in the air and thereafter the volume stabilizes permanently; meanwhile the strength increases with time.

2 Claims, No Drawings

METHOD FOR PRODUCTION OF EXPANSIVE CEMENT

This invention relates to a method for production of expansive cement on the basis of portland cement and expansive admixture which can be applied for filling in joints, for floor, road and other coverings with reduced joints, for various constructions and parts in the monolithic, prefabricated, hydrotechnical and other types of building requiring higher crack and water resistance of concrete.

Various methods of expensive cement production are known, wherein the expansion is due to the increased quantity of calcium trisulphoaluminate hydrate (ettringite) contained in the cement stone. By these methods the necessary aluminate ions are obtained from aluminate cement, sulphoaluminate clinker, thermally processed alunites, etc., as well as from sulphoaluminosilicate product (Soviet Certificate of Authorship No 366164).

Most of these methods require complicated technology to produce the expansive admixture — precise dosage of selected raw materials, followed by crushing, grinding and baking at high temperature within close tolerance of the prescribed regime. The admixture is then added to aluminate or high quality clinker portland cement and the mixture after thorough homogenization is ground to a certain grain-metric composition.

The imperfection of the known methods for expansive cement production is that the expansive admixture is prepared according to a complicated technology requiring selected raw materials. It also requires precise dosage of the components followed by baking and grinding. Besides is the produced cement very sensitive to deviations of the initial raw materials composition and of the technological parameters resulting in its expansion and strength characteristics making control and adjustment difficult.

Another defect results from the fact that due to the low solubility and effectiveness of the components used to produce the aluminate ions, their quantity comes up to 10–40% of the total weight of the expansive cement. Compared to such great quantity the expansion yield is small.

Furthermore, the known methods for expansive cement production call for high quality aluminates or clinker portlandcements, which together with the expansive admixture must be ground to certain fineness, as fluctuations of the grain-metric composition have unfavourable effect on expansion.

Another defect of the known methods is that the cements thus produced stabilize at hardening their volume after 7-30 and more days, particularly cements of greater expansion. Bearing in mind both the great quantity of gypsum in the expansive cements (10-30%) and the low activity of the component producing aluminate ions, the remaining considerable quantities of free gypsum make the hardened expansive cements very vulnerable to outer influences and volume instability, reduction of its strength and cause cracking.

The invention aims at creating a method for expansive cement production based on ordinary portland cements and expansive admixture of a simplified technology whereby its expansion comes to an end at the early stage of hardening resulting in volume stability and high strength with the passage of time.

The essence of the invention lies in the fact that ordinary portland cement and expansive admixture are mixed and homogenised dry, the admixture being 6 to 30% of the total weight and containing 2 to 8% bialuminium pentachloride hydrate, 4 to 15% gypsum and up to 7% lime.

The bialuminium pentachloride hydrate /$Al_2(OH)_5Cl.2,5H_2O$/ is a source of aluminate ions, necessary for the formation of an increased quantity of ettringite. It solves well (above 50%) and has high content of active bialuminium trioxide (about 46%), has low content of chlorine (about 16%) and is not hygroscopic. The lime component is not optional depending on the desire to have greater expansion and lower strength (no lime) or less expansion and higher strength (lime added). When using portland cement of greater activity (mark 450) the expansion is less and the strength higher, while when using portland cement of lower activity (marks 350 and 250) the expansion is greater and the strength lower.

The mixing of the components can be effected either at grinding of the portland cement or after grinding of the components of the expansive cement but in a way providing complete homogenisation. At dry mixing the ettringite forms in the already started process of cement hardening which causes expansion of the cement stone. If the admixture is added beforehand to the water for the cement mix, the ettringite forms at the very beginning of cement binding whereby expansion is about 10 time smaller or does not result at all.

An advantage of this invention is that the method for expansive cement production is of a simplified technology whereby the operations of grinding and baking of the expansive admixture raw materials are not required any more. As the content of active (soluble) bialuminium trioxide in the aluminium salt is constant the quantity of the ettringite and the resulting expansion can be regulated and controlled with precision, and hence the strength of the cement.

Another advantage is that because of the high solubility and effectiveness of the aluminium salt as source of aluminate ions, its content is 2 to 8% of the total weight of the expansive cement.

Furthermore, the production of the expansive cement is based on ordinary portland cement without specific requirements for its composition and grain size.

An additional advantage is that stabilization of the cement stone respectively of its volume occurs after 1 to 2 days and remains steady with the passage of time preserving its high strength. The gypsum in the cement stone binds practically completely i.e. no free gypsum remains and none of the defects caused by it are to be observed.

The invention is elucidated in detail with the following example:

EXAMPLE

The expansive cements are based on portland cements of marks "450", "350" (pure clinker), "350" and "250". The components of the expansive admixture — crystalline bialuminium pentachloride hydrate, semihydrated gypsum and hydrated lime — are homogenized with the portland cement in a periodic action ball mill for 15-20 minutes. The expansive cements thus produced are mixed with quartz sand in a ratio cement:sand = 1:3 and water-cement ratio = 0,5. Demoulding takes place after 6 - 8 hours, after which the hardening proceeds further in the open air or under water. The cement-sand mortar, as well as the cement stone expand in the very 1 and 2 days, preserving their volume with the passage of time (90, 180 and more days).

Table 1 shows the free expansion of the cement-sand mortar (4/4/16 cm prisms) with water cement factor = 0,5 and its strength at various ways of hardening.

Table 2 contains data of cement stone with a water-cement ration 0,33 and the same size of the test samples. Table 3 refers to limited expansion and strength of cementsand mortar = 0,5.

TABLE I

Free expansion and strength of Cement-sand mortar with ratio cement:sand = 1:3 and water-cement factor 0,5 of expansive cements

| Composition of expansive cements in weight % | Expansion % | | | Flexural Strength kgf/cm² | | Compressive Strength kgf/cm² | |
|---|---|---|---|---|---|---|---|
| | 1 day (16-18 hours) | 3 days | 28 days | 1 day | 28 days | 1 day | 28 days |
| "450" - hardening under water | | | | | | | |
| 88C+3A+6G+3W | 0,07 | 0,07 | 0,07 | 31 | 74 | 166 | 502 |
| 91C+3A+6G | 0,09 | 0,10 | 0,10 | 26 | 73 | 148 | 514 |
| 82C+4,5A+9G+4,5W | 0,29 | 0,31 | 0,31 | 28 | 68 | 194 | 469 |
| 76C+6A+12G+6W | 0,89 | 0,91 | 0,92 | 10 | 37 | 92 | 284 |
| Mark "450" - hardening in open air | | | | | | | |
| 82C+4,5A+9G+4,5W | 0,05 | 0,03 | 0,01 | — | 83 | — | 464 |
| 76C+6A+12G+6W | 0,13 | 0,12 | 0,09 | — | 87 | — | 491 |
| Mark "350"(clinker) - hardening under water | | | | | | | |
| 88C+3A+6G+3W | 0,50 | 0,73 | 0,73 | 12 | 66 | 53 | 410 |
| 82C+4,5A+9G+4,5W | 1,59 | 1,98 | 1,98 | 6 | 37 | 30 | 209 |
| 76C+6A+12G+6W | 4,11 | 4,14 | 4,14 | — | 18 | 10 | 86 |
| Mark "350"(clinker) - hardening in open air | | | | | | | |
| 82C+4,5A+9G+4,5W | 0,32 | 0,30 | 0,27 | 21 | 55 | 92 | 332 |
| 76C+6A+12G+6W | 0,50 | 0,46 | 0,44 | 25 | 54 | 122 | 313 |
| Mark "350" - hardening under water | | | | | | | |
| 88C+3A+6G+3W | 0,33 | 0,36 | 0,36 | 12 | 69 | 58 | 392 |
| 82C+4,5A+9G+4,5W | 1,19 | 1,19 | 1,20 | 11 | 38 | 48 | 236 |
| 76C+6A+12G+6W | 1,84 | 2,21 | 2,21 | 6 | 28 | 29 | 190 |
| Mark "250" - hardening under water | | | | | | | |
| 88C+3A+6G+3W | 1,28 | 1,56 | 1,56 | 5 | 58 | 16 | 291 |
| 91C+3A+6G | 3,40 | 3,43 | 3,44 | — | 19 | 6 | 136 |
| Mark "250" - hardening in open air | | | | | | | |
| 88C+3A+6G+3W | 0,14 | 0,18 | 0,14 | — | 55 | — | 267 |
| 91C+3A+6G | 0,37 | 0,34 | 0,29 | — | 51 | — | 264 |

Note:
Abbreviations in the Tables:
"C" - Portlandcement
"A" - $Al_2(OH)_5Cl.2,5H_2O$
"G" - $CaSO_4.0,5H_2O$
"W" - $Ca(OH)_2$

Table 2

Free Expansion and strength of cement stone with water factor 0,33 of expansive cements

| Composition of expansive cements in weight % | Expansion % | | | Flexural Strength kgf/cm² | | Compressive Strength kgf/cm² | |
|---|---|---|---|---|---|---|---|
| | 1 day 18 hours | 3 days | 28 days | 1 day | 28 days | 1 day | 28 days |
| Mark "450" - hardening under water | | | | | | | |
| 88C+3A+6G+3W | 0,31 | 0,42 | 0,44 | 44 | 84 | 168 | 818 |
| 91C+3A+6G | 0,44 | 0,49 | 0,52 | 42 | 93 | 170 | 808 |
| 82C+4,5A+9G+4,5W | 0,43 | 1,20 | 1,26 | 45 | 30 | 182 | 795 |
| Mark "350" - hardening under water | | | | | | | |
| 8C+4,5A+9G+4,5W | 1,44 | 15,06 | 15,06 | 12 | 13 | 37 | 98 |
| 86,5C+4,5A+9G | 15,90 | 15,94 | 15,94 | — | 6 | — | 65 |
| Mark "250" - hardening under water | | | | | | | |
| 88C+3A+6G+3W | 3,82 | 5,96 | 6,09 | 6 | 66 | 22 | 389 |
| 91C+3A+6G | 7,49 | 9,89 | 9,90 | — | 41 | 7 | 218 |
| Mark "250" - hardening in open air | | | | | | | |
| 88C+3A+6G+3W | 0,49 | 0,66 | 0,49 | — | 37 | — | 438 |
| 91C+3A+6G | 1,11 | 1,58 | 1,35 | — | 50 | — | 393 |

Table 3

Limited expansion and strength of cement-sand mortar with ration cement-sand = 1:3 and water factor 0,5 of expansive cements

| Composition of expansive cements & % of reinforcement | Expansion % | | | Flexural Strength kgf/cm² | | Compressive Strength kgf/cm² | |
|---|---|---|---|---|---|---|---|
| | 1 day (16-18 hours) | 3 days | 28 days | 1 day | 28 days | 1 day | 28 days |
| Mark "450" - hardening under water | | | | | | | |
| 76C+6A+12G+6W reinforcement | | | | | | | |
| " 0,20% | 0,22 | 0,23 | 0,23 | 15 | 62 | 115 | 375 |
| " 0,44% | 0,10 | 0,12 | 0,12 | 19 | 74 | 129 | 406 |
| " 1,23% | 0,14 | 0,04 | 0.04 | 23 | 66 | 136 | 384 |

Table 3-continued

| Composition of expansive cements & % of reinforcement | Expansion % | | | Flexural Strength kgf/cm² | | Compressive Strength kgf/cm² | |
|---|---|---|---|---|---|---|---|
| | 1 day (16–18 hours) | 3 days | 28 days | 1 day | 28 days | 1 day | 28 days |
| Mark "350" - hardening under water | | | | | | | |
| 82C+4,5A+9G+4,5W reinforcement 0,44% | 0,07 | 0,08 | 0,08 | 14 | 63 | 63 | 282 |

Table 3-continued: Limited expansion and strength of cement-sand mortar with ration cement-sand=1:3 and water factor 0,5 of expansive cements

What we claim is:

1. A method for expanding cement compositions from portland cement and an expanding additive, which comprises dry mixing portland cement and an expanding additive containing 2 to 8% bialuminium pentachloride hydrate, and 4 to 15% gypsum.

2. The method of claim 1 in which the expanding additive also contains a small but effective amount of lime up to about 7%.